United States Patent [19]
Quintana

[11] Patent Number: 5,379,161
[45] Date of Patent: Jan. 3, 1995

[54] METHOD AND SYSTEM FOR SYNCHRONIZATION CHARACTER LOCATION AND PREDICTION IN A DATA STORAGE SYSTEM

[75] Inventor: Fernando Quintana, Tucson, Ariz.

[73] Assignee: International Business Machines Corporation, Armonk, N.Y.

[21] Appl. No.: 75,623

[22] Filed: Jun. 14, 1993

[51] Int. Cl.⁶ .............................................. G11B 5/09
[52] U.S. Cl. .................................................... 360/51
[58] Field of Search ................... 360/40, 32, 48, 51, 360/53, 77.04, 77.06, 77.08; 375/114, 116

[56] References Cited

U.S. PATENT DOCUMENTS

| | | | |
|---|---|---|---|
| 4,868,922 | 9/1989 | Tsuji et al. | 360/40 X |
| 4,872,155 | 10/1989 | Yokogawa et al. | 369/59 |
| 5,057,949 | 10/1991 | Suga et al. | 360/10.2 |
| 5,119,243 | 6/1992 | Shimazaki et al. | 360/30 X |
| 5,123,013 | 6/1992 | Hirayama | 370/105.4 |
| 5,193,035 | 3/1993 | Kanota et al. | 360/51 |
| 5,229,986 | 7/1993 | Mizokami et al. | 369/59 |
| 5,233,487 | 8/1993 | Christensen et al. | 360/77.04 |

*Primary Examiner*—Donald Hajec
*Assistant Examiner*—Thien Minh Le
*Attorney, Agent, or Firm*—D. A. Shifrin; Andrew J. Dillon

[57] ABSTRACT

A method and system for locating and predicting synchronization characters within data blocks stored within multiple tracks on a removable data storage medium in a data storage system. The location and identity of each diverse synchronization character within multiple data blocks is predicted in response to an identification of an initial acquisition character and an identification of a particular data storage format. A first synchronization character is predicted and a synchronization counter is then incremented in response to a detection of each subsequent synchronization character, or, in response to the elapse of one of two predetermined delay periods. A system clock delay period is initiated immediately after each synchronization character is detected and the synchronization counter is then incremented at the end of that delay period. A second delay period is initiated thereafter, utilizing a derived track clock signal, which is reasonably insensitive to variations in storage media transport speed. The expiration of this second delay period is then utilized to increment the synchronization counter, if no synchronization character has been detected prior to that occurrence. In this manner, variations in tape speed and an occasional missed synchronization character may be accommodated and the identity and location of predicted synchronization characters may be accurately determined.

6 Claims, 4 Drawing Sheets

METHOD AND SYSTEM FOR SYNCHRONIZATION CHARACTER LOCATION AND PREDICTION IN A DATA STORAGE SYSTEM

BACKGROUND OF THE INVENTION

1. Technical Field

The present invention relates in general to improved data storage systems and in particular to improved methods and systems for the location of synchronization characters within data stored within a data storage system. Still more particularly, the present invention relates to improved methods and systems for locating synchronization characters within data stored in a data storage system by predicting the occurrence of specific synchronization characters during selected periods of time.

2. Description of the Related Art

Modern data processing systems often use digital signal recording devices attached to host processors to record records as addressable units within magnetic tape storage systems.

Examples of systems which may be utilized to record records within a magnetic tape storage system are disclosed within Milligan et al., U.S. Pat. No. 4,393,445; Milligan et al., U.S. Pat. No. 4,435,762; Videki II, U.S. Pat. No. 4,471,457; Cole et al., U.S. Pat. No. 4,603,382; Bauer et al., U.S. Pat. No. 4,423,480; and Fry et al., U.S. Pat. No. 4,403,286. Each of the aforementioned patents discloses a magnetic tape storage system which may be advantageously employed in carrying out the method and system of the present invention.

In such data storage systems, it is practically a necessity that each track of data within the recording medium include multiple synchronization characters. Such synchronization characters are necessary so that the data may be considered self-synchronizing. Without such self-synchronizing, data may not be successfully recovered.

In modern data storage systems data is typically written to multiple tracks simultaneously. When such multiple track recording is utilized it is possible to determine various necessary parameters which may affect data recovery, even though individual track data within a group of multiple tracks may be lost. One such parameter is the location of the end of a particular block of data. It is imperative to accurately identify the end of a block of data in order to prevent errors which may occur due to overwriting data when additional data is appended to a record.

Systems which have been proposed to detect the end of a data block more reliably typically use a group of diverse synchronization characters which are positioned in a unique order within a data block, such that the end of a data block may be successfully located even though multiple tracks within a multiple track group have lost synchronization, the detection of such diverse synchronization characters presents a problem for individual tracks within a multiple track recording system, since a track may lose synchronization and thus, may not know what particular synchronization mark to expect. If an individual track within a multiple track recording system does not know which synchronization character to expect that track may never synchronize or may synchronize at the wrong point. If a large enough number of tracks within a multiple track system lose synchronization, the ability of known error correction circuitry to correct such problems is soon exceeded and the data cannot therefore be recovered.

It should therefore be obvious that a need exists for a method and system whereby the location and identification of unique synchronization characters within a data block may be accomplished. Additionally, such a system should be sufficiently robust such that variations in tape speed and occasional missed synchronization marks will not result in a loss of synchronization for an individual track.

SUMMARY OF THE INVENTION

It is therefore one object of the present invention to provide an improved data storage system.

It is another object of the present invention to provide an improved method and system for location of synchronization characters within data in a data storage system.

It is yet another object of the present invention to provide an improved method and system for locating synchronization characters within data in a data storage system by predicting the occurrence of specific synchronization characters during selected periods of time.

The foregoing objects are achieved as is now described. A method and system are disclosed for locating and predicting synchronization characters within data blocks stored within multiple tracks on a removable data storage medium in a data storage system. The location and identity of each diverse synchronization character within multiple data blocks is predicted in response to an identification of an initial acquisition character and an identification of a particular data storage format. A first synchronization character is predicted and a synchronization counter is then incremented in response to a detection of each subsequent synchronization character, or, in response to the elapse of one of two predetermined delay periods. A system clock delay period is initiated immediately after each synchronization character is detected and the synchronization counter is then incremented at the end of that delay period. A second delay period is initiated thereafter, utilizing a derived track clock signal, which is reasonably insensitive to variations in storage media transport speed. The expiration of this second delay period is then utilized to increment the synchronization counter, if no synchronization character has been detected prior to that occurrence. In this manner, variations in tape speed and an occasional missed synchronization character may be accommodated and the identity and location of predicted synchronization characters may be accurately determined.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
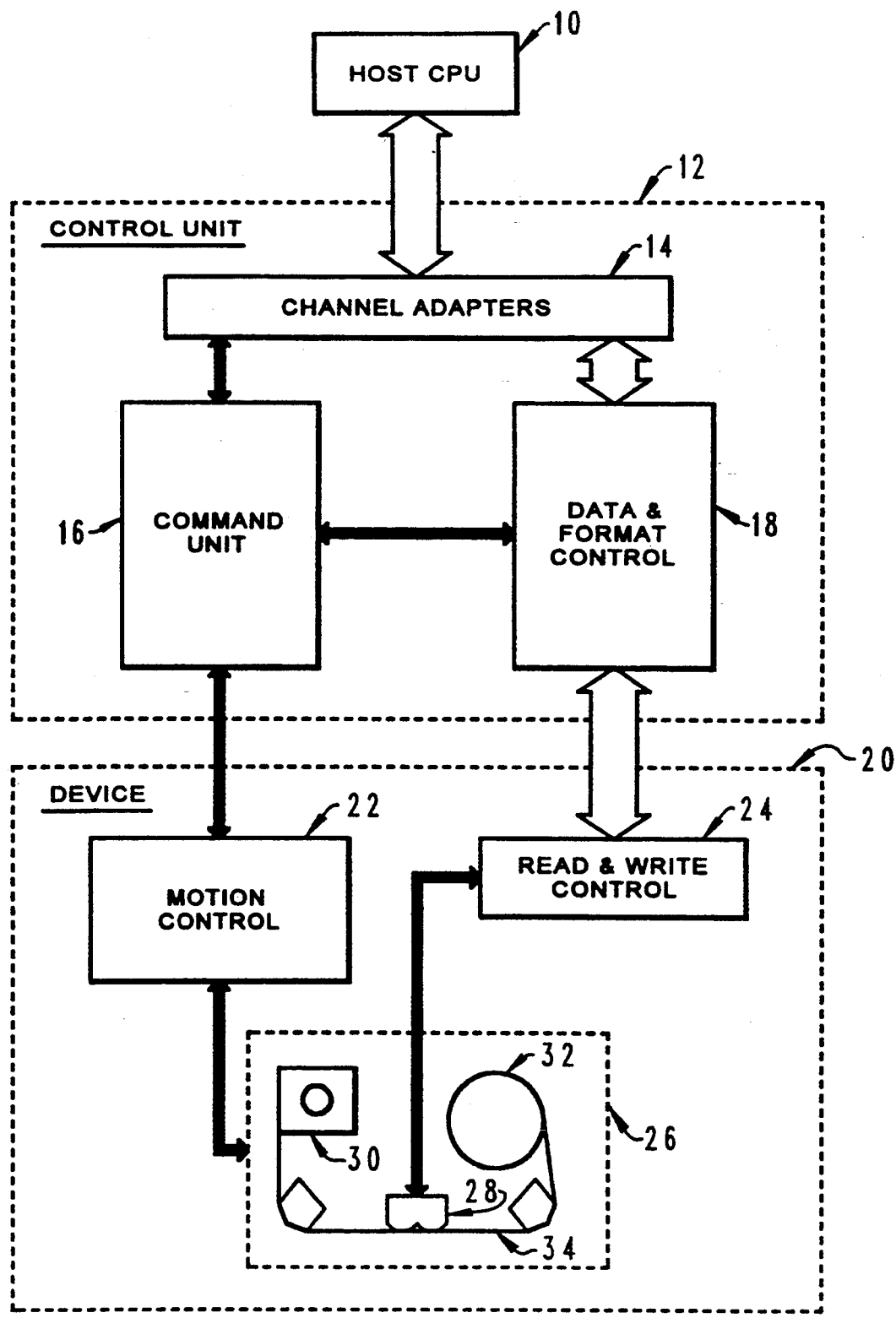
FIG. 1 is a schematic representation of a data storage system which may be utilized with the method and system of the present invention.

With reference now to the figures and in particular with reference to FIG. 1, there is depicted a schematic representation of a data storage system which may be utilized with the method and system of the present invention. As illustrated, a data processing system having a host central processing unit 10 coupled to one or more storage systems. Such storage systems may be implemented utilizing a tape storage system such as the International Business Machines Model No. 3480, 3490, or 3490E Magnetic Tape System. For ease of illustration, a single host CPU and tape storage system are depicted within FIG. 1. As illustrated, host central processing unit 10 is coupled to control unit 12 and at least one magnetic tape recording for playback device 20, and controls such devices accordingly.

As illustrated, control unit 12 includes a command unit 16 which is coupled, via channel adapters 14, to host central processing unit 10, in order to accept commands from host central processing unit 10 to control the mechanical operation of storage device 20. Command unit 16 also preferably controls the flow of data between channel adapters 14 and tape 34, via data and format control 18 and read and write control 24.

As illustrated within FIG. 1, tape storage device 20 preferably includes motion control 22, for controlling the handling of magnetic tape media, and read and write control 24, which includes both read and write circuits for operating on a magnetic transducing head 28 within tape path 26. Tape path 26 preferably includes a tape cartridge 30 having a tape supply reel therein and a tape take-up reel 32 well known motors and control systems may be utilized for transporting magnetic tape 34 past head 28 for writing data to and reading data from tape 34. The location and prediction of synchronization characters within the data, in accordance with the method and system of the present invention, are accomplished utilizing synchronization character prediction circuitry which is contained within data and format control 18 and which will be explained in greater detail herein.

Figure 2:
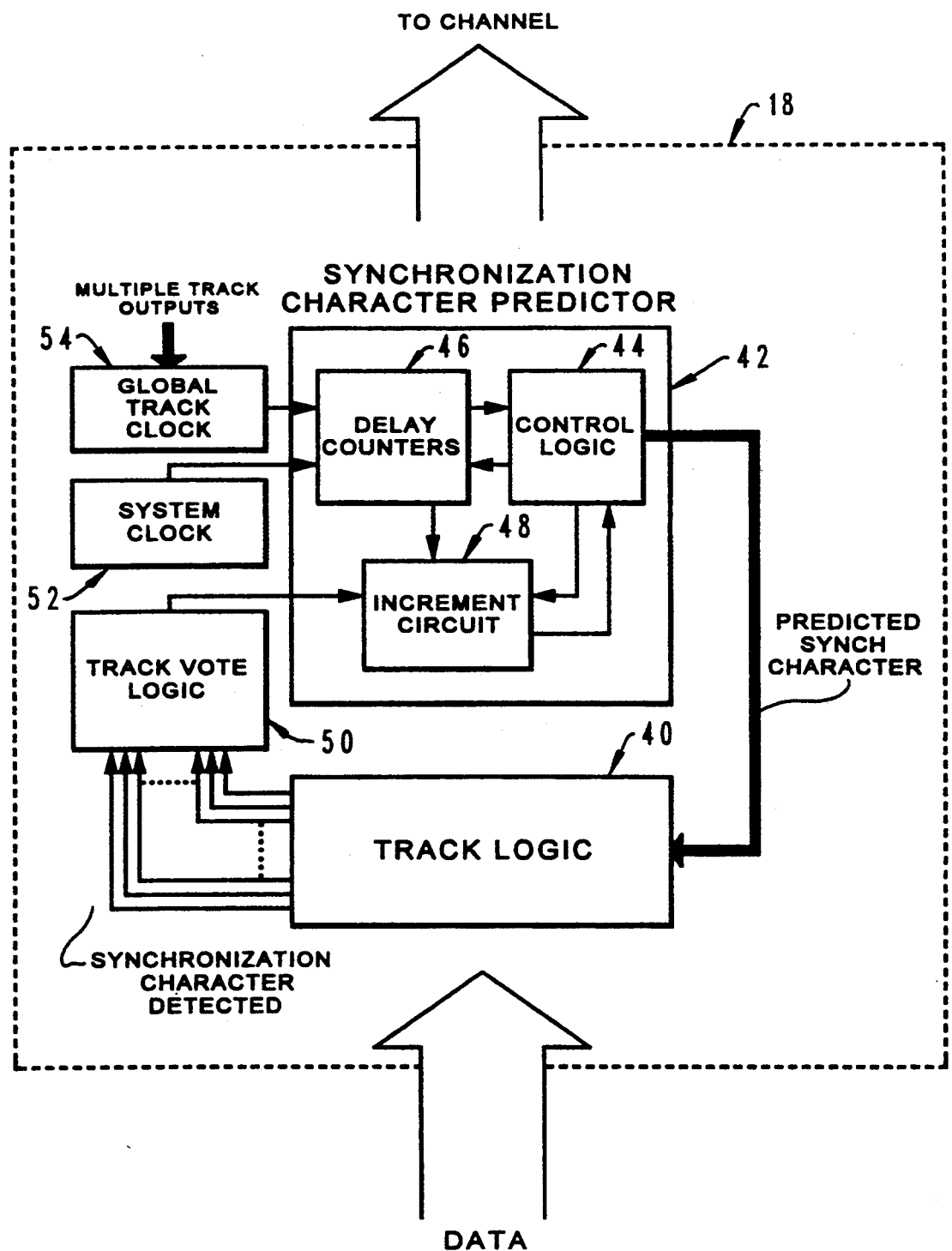
FIG. 2 is a high level block diagram of the data and format control circuitry of the data storage system of FIG. 1.

Referring now to FIG. 2, there is depicted a high level block diagram of the data and format control circuit 18 of the data storage system of FIG. 1. As illustrated, data from head 28 is coupled, via read and write control 24, to track logic 40. Track logic 40 is utilized to characterize the data read by head 28 and, although not depicted within FIG. 2, to couple data read from tape 34 to host CPU 10, in a manner well known to those having ordinary skill in the art. The initiation of the retrieval of data from tape 34 is typically preceded by the detection of an acquisition character or acquisition "burst" which is designed to allow individual track clocks to simultaneously acquire bit synchronization for the data on each track. This acquisition character or burst is typically a repeating pattern of bytes which, when modulated and adjusted, produces a unique repeating pattern of bits which is recognized within data and format control circuit 18 as an acquisition character.

In accordance with the method and system of the present invention, the detection of this acquisition character results in synchronization character predictor 42 coupling information regarding a predicted synchronization character to track logic 40. Thereafter, track logic 40 serves to determine whether or not each individual track within a multiple track recording system has detected this predicted synchronization character. As depicted within FIG. 2, each track which detects this synchronization character couples an output to track vote logic 50. In such systems a synchronization character is determined to be detected in the event a majority of the tracks within a multiple track group detects that synchronization character. Thus, for a group of sixteen tracks, if twelve tracks detect the synchronization character that character will be identified as having been detected. Therefore, once the first predicted synchronization character has been detected, this information is coupled to increment circuit 48.

Next, in accordance with an important feature of the present invention, two separate delay periods are utilized. A first delay period is initiated in response to the detection of each synchronization character and is driven by system clock 52. System clock 52 is coupled to delay counter 46, and when this first delay period has elapsed, the output of delay counter 46 is coupled to increment circuit 48 and utilized to increment the count continued therein. In accordance with the depicted embodiment of the present invention, this first delay period is characterized such that its expiration will occur at a point approximately midway between adjacent synchronization characters, such that the synchronization character counter may be updated while the probability of detecting a synchronization character is quite low. This is an important feature in view of the fact that skew may spread the synchronization characters out over a wide area.

Thus, each time a synchronization character is detected, system clock 52 initiates a system clock delay period and the expiration of that period is utilized to update increment circuit 48. Alternately, each time the system clock delay period expires, a second delay period is initiated based upon a so-called "global" track clock which is derived from multiple track outputs. This global clock track is utilized for instances in which a synchronization character has not been detected, since the global track clock is relatively insensitive to variations in the apparent speed of the tape and drifting of the system clock. Thereafter, in the event a subsequent synchronization character has not been detected, delay counter 46 will update the output of increment circuit 48, in response to the expiration of the second delay period which is based upon global track clock 54. Again, this period of time is calculated to expire in the area approximately midway between synchronization characters.

In summary, synchronization character predictor 42, as illustrated within FIG. 2, provides an identification of a predicted synchronization character to track logic 40 and updates that prediction following a predetermined number of intermediate resynchronization characters, in a manner which will be illustrated in greater detail herein. Control logic 44 is utilized to set and reset increment circuit 48 each time a series of resynchronization characters has occurred and thereafter update the predicted synchronization character output to track logic 40, in order to permit each track to know the expected identity of the next synchronization character.

Figures 3, 4:
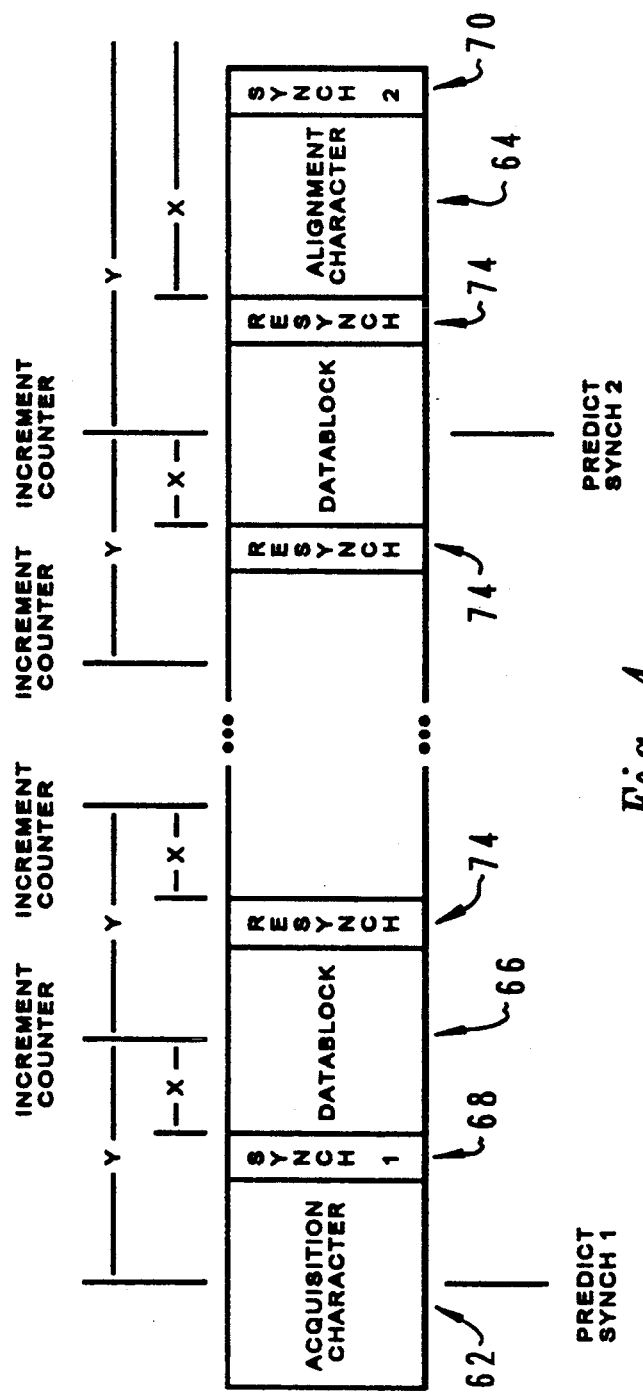
FIG. 3 is a pictorial representation of a portion of one track of data stored within a selected format having diverse synchronization characters disposed therein.
FIG. 4 is an enlarged representation of a portion of the track of data depicted in FIG. 3 illustrating the location and prediction of synchronization characters in accordance with the method and system of the present invention.

Referring now to FIG. 3, there is illustrated a pictorial representation of one track of data stored within a selected format having diverse synchronization characters disposed therein. As illustrated, this track begins with acquisition character 62. Thereafter, a first synchronization character 68 is depicted. Next, in accordance with this particular format of data storage, eight data blocks 66 are depicted, each followed by a resynchronization character 74. For purposes of clarity of illustration, reference numerals are not provided for each resynchronization character and data block; however, those skilled in the art will appreciate that this particular format is illustrative in nature and various data storage systems may use alternate formats of diverse synchronization characters.

Next, following a group of eight data blocks, an alignment character 64 is provided, permitting each track to regain alignment, in the event alignment has been lost during a preceding block of data blocks. A second synchronization character 70 follows this alignment character and again, thereafter, a group of eight data blocks and resynchronization characters is provided. In a similar manner, a sequent alignment character 64 occurs followed by a third synchronization character and a group of data blocks and resynchronization characters.

Referring now to FIG. 4, an enlarged representation of a portion of the track of data depicted within FIG. 3 is illustrated which shows the location and prediction of synchronization characters in accordance with the method and system of the present invention. As described above and as illustrated within FIG. 4, the detection of acquisition character 62 results in a prediction that synchronization character one will occur. Track logic 40 (see FIG. 2) is then utilized to detect the occurrence of synchronization character one, as illustrated at reference numeral 68. Thereafter, in the event synchronization character one has been detected, a system clock delay period X is initiated. As illustrated, system clock delay period X is calculated to expire in the area approximately midway between adjacent synchronization characters. After synchronization character one has been detected, the synchronization counter is incremented, in response to the expiration of system clock delay period X. Thereafter, a derived track clock delay period Y is initiated which is also calculated to expire in the area approximately midway between adjacent synchronization characters.

As illustrated within FIG. 4, the synchronization character predictor increment circuit 48 (see FIG. 2) is then updated following the expiration of a system clock delay period, following the detection of each subsequent synchronization character, or alternately, following the expiration of a derived track clock delay period, in response to the failure of the system to detect a synchronization character, after synchronization character one. As depicted, after the proper number of resynchronization characters 74 are detected or assumed as a result of the expiration of the second delay period, the detection of the penultimate resynchronization character 74 and the subsequent expiration of system clock delay period X, or the expiration of derived track clock delay period Y will result in an updating of the output of synchronization character predictor 42 to predict the occurrence of synchronization character two. In this manner, each track within the data storage system is constantly apprised of which synchronization character will occur next and the loss of synchronization due to the missing of an occasional synchronization character is avoided.

Figure 5:
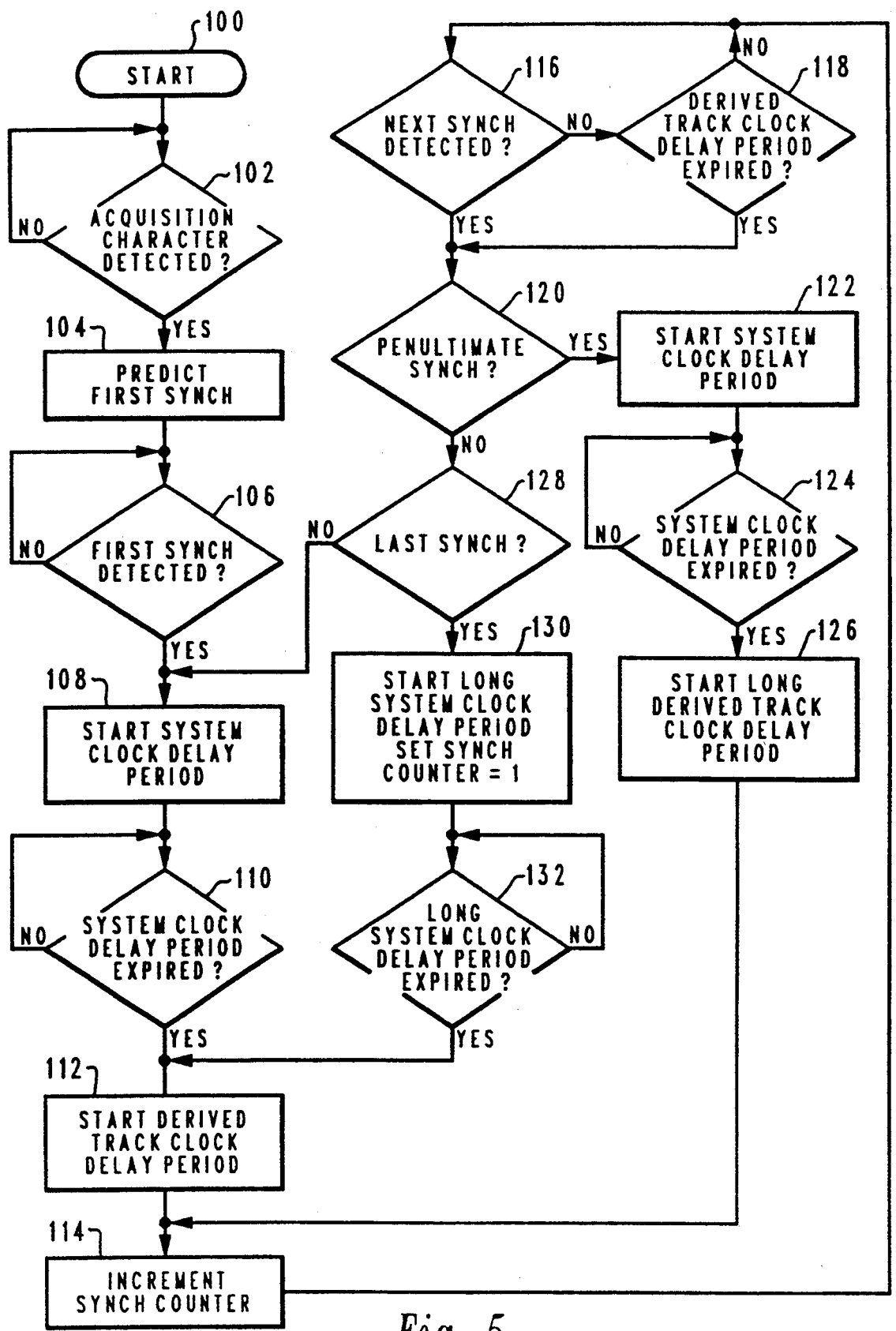
FIG. 5 is a high level logic flowchart illustrating a method for implementing the present invention.

Finally, with reference to FIG. 5, there is depicted a high level logic flowchart which illustrates the method for implementing the present invention. As depicted, the process begins at block 100 and thereafter passes to block 102. Block 102 illustrates a determination of whether or not the acquisition character or burst has been detected. If not, the process merely iterates until such time as the acquisition character has been detected. Alternately, once the acquisition character has been detected, the process passes to block 104. Block 104 illustrates the predicting of the first synchronization character.

Next, the process passes to block 106. Block 106 illustrates a determination of whether or not the first synchronization character has been detected. If not, as illustrated, the process merely iterates until such time as the first synchronization character has been detected. Those having skill in the art will appreciate that unless the first synchronization character following an acquisition character is detected, the track will not synchronize and no data may be read. Still referring to block 106, after determining that the first synchronization character has been detected, the process passes to block 108. Block 108 illustrates the starting of the system clock delay period. Next, the process passes to block 110. Block 110 illustrates a determination of whether or not the system clock delay period has expired and if not, as illustrated, the process merely iterates until such time as the system clock delay period has expired.

Still referring to block 110, once the system clock delay period has expired, the process passes to block 112. Block 112 illustrates the starting of the derived track clock delay period which is driven by the global track clock described above with respect to FIG. 2. Next, the process passes to block 114. Block 114 illustrates the incrementing of the synchronization counter within the synchronization character predictor circuit. Thereafter, the process passes to block 116.

Block 116 illustrates a determination of whether or not a next synchronization character has been detected. If not, the process passes to block 118. Block 118 illustrates a determination of whether or not the derived track clock delay period has expired. If not, the process returns to block 116 in an iterative fashion to continue to attempt to detect the next synchronization character. However, once the derived track clock delay period has expired, as determined at block 118, the process passes to block 120. Block 120 illustrates a determination of whether or not the synchronization character which has either been detected or assumed as a result of the expiration of the derived track clock delay period was the penultimate synchronization character. That is, the seventh resynchronization character within a group of data blocks in the format depicted within FIG. 3 herein. If so, the process passes to block 122.

Block 122 illustrates the starting of the system clock delay period based upon the detection of assumption of the occurrence of a synchronization character and the process then passes to block 124. Block 124 illustrates a determination of whether or not the system clock delay period has expired and if not, as illustrated, the process iterates until such time as that delay period has expired.

Once the system clock delay period has expired, the process passes to block 126. Block 126 illustrates the starting of a long derived track clock delay period and the prediction of the next synchronization character. As those skilled in the art will appreciate upon reference to FIG. 4, a resynchronization character occurs just prior to each alignment character and the next synchronization character then occurs after the alignment character. Thus, a long derived track clock delay period is necessary when the synchronization character detected is the seventh synchronization character within a group of eight, in the format depicted within FIG. 3. Thereafter, the process passes to block 114 which illustrates the incrementing of the synchronization counter within the synchronization character predictor circuit. The process then returns to block 116 in an iterative fashion to await detection of the next synchronization character.

Referring again to block 120, in the event the synchronization character detected is not the penultimate resynchronization character within a group of eight such characters, the process passes to block 128. Block 128 illustrates a determination of whether or not the synchronization character detected is the last synchronization character within the group of resynchronization characters and if not, the process returns to block 108 in an iterative fashion and once again starts the system clock delay period.

Still referring to block 128, in the event the synchronization character which has been detected or assumed is the last synchronization character within the group of resynchronization characters, the process passes to block 130. Block 130 illustrates the starting of a long system clock delay period and the setting of the synchronization counter to one. This occurs in order to permit the synchronization counter to once again either detect or assume the eight resynchronization characters which occur between each synchronization character in the format depicted within FIG. 3. Thereafter, the process passes to block 132. Block 132 illustrates a determination of whether or not the long system clock delay period has expired and if not, the process continues in an iterative fashion until such time as the long system clock delay period has expired. Once the system clock delay period has expired, the process returns, in an iterative fashion, to block 112 to once again start a normal derived track clock delay period and the process continues.

Upon reference to the foregoing those skilled in the art will appreciate that the Applicant has provided a technique for updating a synchronization character counter in a manner such that this updating will always occur between adjacent synchronization marks and, in a manner such that fairly severe clock variations may be accommodated despite missing synchronization characters since a derived track clock delay period is utilized in those circumstances in which synchronization characters are not detected. Thus, despite skew which may cause synchronization characters to be spread over a wide area, the probability of updating the synchronization character counter in an accurate manner has been greatly enhanced and the ability of the synchronization character predictor circuit to accurately predict the identity and location of the next synchronization character greatly enhances the ability of the system to maintain synchronization during data recovery.

While the invention has been particularly shown and described with reference to a preferred embodiment, it will be understood by those skilled in the art that various changes in form and detail may be made therein without departing from the spirit and scope of the invention.

I claim:

1. A storage system for accurately storing and reading data within multiple tracks on a removable data storage medium mounted therein, said data including an initial acquisition data character and multiple diverse synchronization characters disposed therein in an order determined in accordance with a predetermined format identification, said system comprising:

a transducing head;

means for moving said removable data storage medium relative to said transducing head;

means for controlling said transducing head to store and read data within multiple tracks on said removable data storage medium;

a clock circuit;

a synchronization character predictor circuit coupled to said transducer head for generating an output indicative of an expected one of said multiple diverse synchronization characters in response to detection of said initial acquisition data character; and a synchronization character increment counter coupled to said synchronization character predictor circuit and said clock circuit for updating said output of said synchronization character predictor circuit in response to either detection of said expected one of said multiple diverse synchronization characters or an elapse of a predetermined period of time in combination with a failure of detection of said expected one of said multiple diverse synchronization characters wherein synchronization characters within said data may be efficiently located, permitting data to be accurately stored and read within said removable data storage medium.

2. The storage system according to claim 1, wherein said clock circuit includes a global track clock circuit coupled to an output of a plurality of said multiple tracks for generating a derived track clock signal wherein said derived track clock signal is insensitive to speed variations of said removable data storage medium.

3. The storage system according to claim 2, wherein said synchronization character increment counter updates said output of said synchronization character predictor circuit in response to an elapse of a first delay period following detection of said expected one of said multiple diverse synchronization characters.

4. The storage system according to claim 3, wherein said synchronization character increment counter updates said output of said synchronization character predictor circuit in response to an elapse of a predetermined period of time following said first delay period in combination with a failure of detection of said expected one of said multiple diverse synchronization characters, wherein said predetermined period of time is determined utilizing said derived track clock signal.

5. The storage system according to claim 1, wherein said removable data storage medium comprises a removable magnetic tape cartridge.

6. A method for accurately storing and reading data within multiple tracks on a removable data storage medium mounted within a storage system wherein said data includes an initial acquisition data character and multiple diverse synchronization characters, said method comprising the steps of:

detecting said initial acquisition data character;

predicting a detection of a selected one of said multiple diverse synchronization characters in response to said detecting of said initial acquisition data character; and updating said prediction of a detection of a selected one of said multiple diverse synchronization characters in response to a detection of said selected one of said multiple diverse synchronization characters or an elapse of a predetermined period of time in combination with a failure of detection of said selected one of said multiple diverse synchronization characters.

* * * * *